(12) United States Patent
Huang

(10) Patent No.: US 8,313,071 B2
(45) Date of Patent: Nov. 20, 2012

(54) MICRO-ADJUSTABLE SUPPORTING DEVICE

(76) Inventor: Ming-Hsien Huang, Taipei Hsien (TW)

( * ) Notice: Subject to any disclaimer, the term of this patent is extended or adjusted under 35 U.S.C. 154(b) by 191 days.

(21) Appl. No.: 12/985,493

(22) Filed: Jan. 6, 2011

(65) Prior Publication Data

US 2012/0056057 A1    Mar. 8, 2012

(30) Foreign Application Priority Data

Sep. 2, 2010    (TW) .............................. 99129661 A

(51) Int. Cl.
*A47G 1/10*    (2006.01)
(52) U.S. Cl. ..................................... 248/276.1
(58) Field of Classification Search ............... 248/122.1, 248/125.2, 125.7, 121, 177.1, 178.1, 187.1, 248/176.3, 179.1, 186.2, 349.1
See application file for complete search history.

(56) References Cited

U.S. PATENT DOCUMENTS

2008/0179475 A1*   7/2008   Whitley et al. ............. 248/218.4
2010/0242808 A1*   9/2010   Negoro et al. .................. 108/42

FOREIGN PATENT DOCUMENTS

EP           1 867 911 A     12/2007
* cited by examiner

*Primary Examiner* — Vivek Koppikar
*Assistant Examiner* — Muhammad Ijaz
(74) *Attorney, Agent, or Firm* — Frommer Lawrence & Haug LLP; Ronald R. Santucci

(57) ABSTRACT

A micro-adjustable supporting device includes a mounting seat, a movable unit, and an adjusting unit. The movable unit includes a rotating assembly disposed rotatably in the mounting seat and rotatable about an axis, and a bottom seat assembly disposed under the mounting seat and rotatable about the axis. The adjusting unit includes a pair of spaced-apart first and second tilt-adjusting elements, and an angle-adjusting element. Each of the first and second tilt-adjusting elements extends through the rotating assembly to connect with the bottom seat assembly, and is movable relative to the rotating assembly in a direction parallel to the axis to adjust a tilt angle of the bottom seat assembly relative to the axis. The angle-adjusting element is operable to move relative to the mounting seat to thereby rotate the rotating assembly and the bottom seat assembly about the axis.

6 Claims, 9 Drawing Sheets

MICRO-ADJUSTABLE SUPPORTING DEVICE

CROSS-REFERENCE TO RELATED APPLICATION

This application claims priority of Taiwanese Patent Application No. 099129661, filed on Sep. 2, 2010, the disclosure of which is incorporated herein by reference.

BACKGROUND OF THE INVENTION

1. Field of the Invention

This invention relates to a supporting device, and more particularly to a rotational angle and tilt angle micro-adjustable supporting device.

2. Description of the Related Art

In a meeting room or audiovisual room, a conventional ball-and-socket joint type supporting device is used to mount a projector to a ceiling. Typically, the rotational angle and tilt angle of the supporting device are adjustable to allow the projector to face accurately a projection screen, such that an image can be formed clearly on the projection screen. For example, a similar supporting device is disclosed in EP1867911. A micro-adjustment, however, cannot be performed on a ball-and-socket joint.

SUMMARY OF THE INVENTION

The object of this invention is to provide a rotational angle and tilt angle micro-adjustable supporting device.

Accordingly, a micro-adjustable supporting device of this invention includes a mounting seat, a movable unit, and an adjusting unit. The movable unit includes a rotating assembly disposed rotatably in the mounting seat and rotatable about an axis, and a bottom seat assembly disposed under the mounting seat and rotatable about the axis. The adjusting unit includes a pair of spaced-apart first and second tilt-adjusting elements, and an angle-adjusting element. Each of the first and second tilt-adjusting elements extends through the rotating assembly to connect with the bottom seat assembly, and is movable relative to the rotating assembly in a direction parallel to the axis to adjust a tilt angle of the bottom seat assembly relative to the axis. The angle-adjusting element is operable to move relative to the mounting seat to thereby rotate the rotating assembly and the bottom seat assembly about the axis.

As such, if the mounting seat and the bottom seat assembly are mounted respectively to a ceiling and a projector, through operation of the first and second tilt-adjusting elements and the angle-adjusting element, the rotational angle and tilt angle of the projector can be micro-adjusted.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
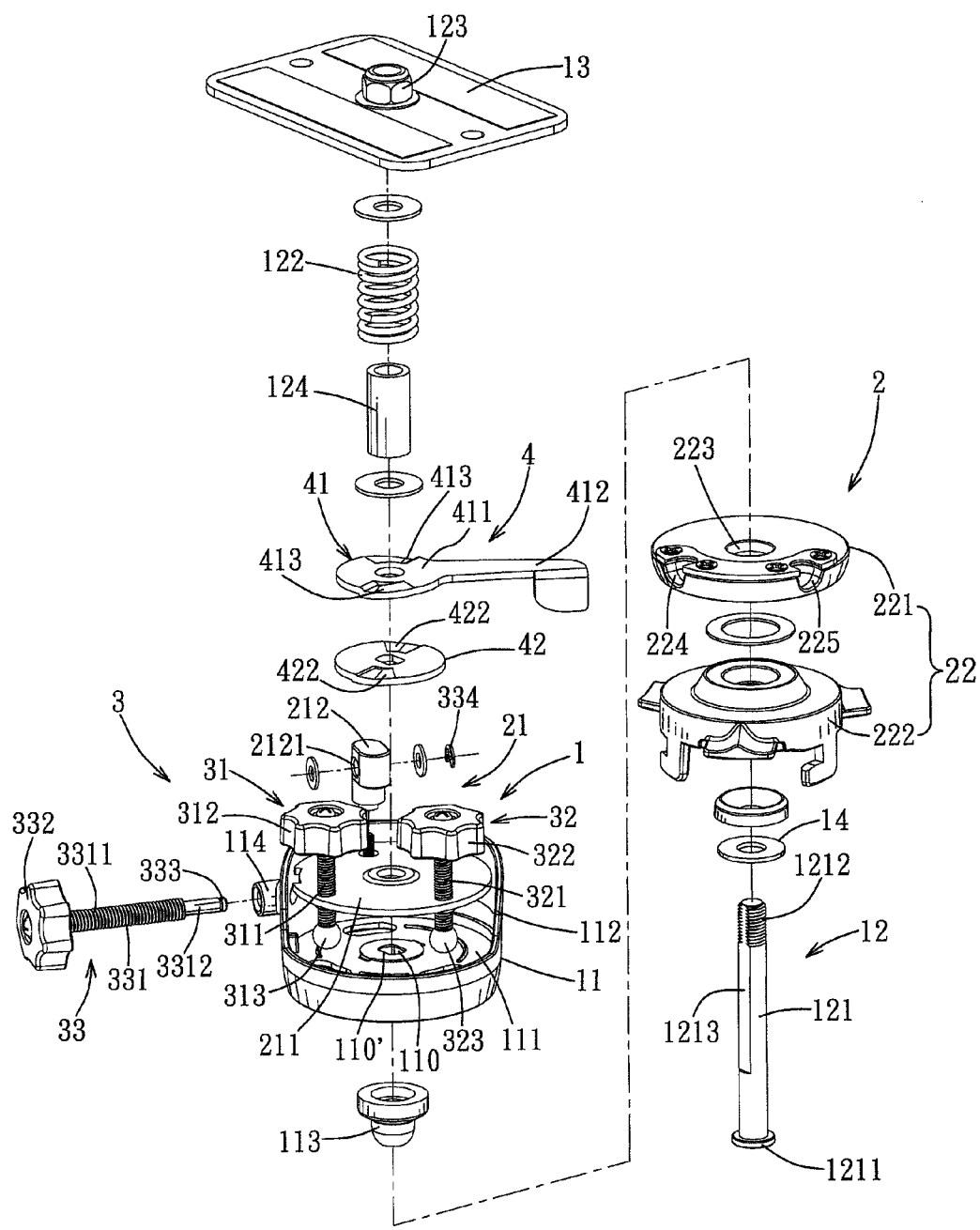
FIG. 1 is an exploded top perspective view of the preferred embodiment of a micro-adjustable supporting device according to this invention.
Figure 2:
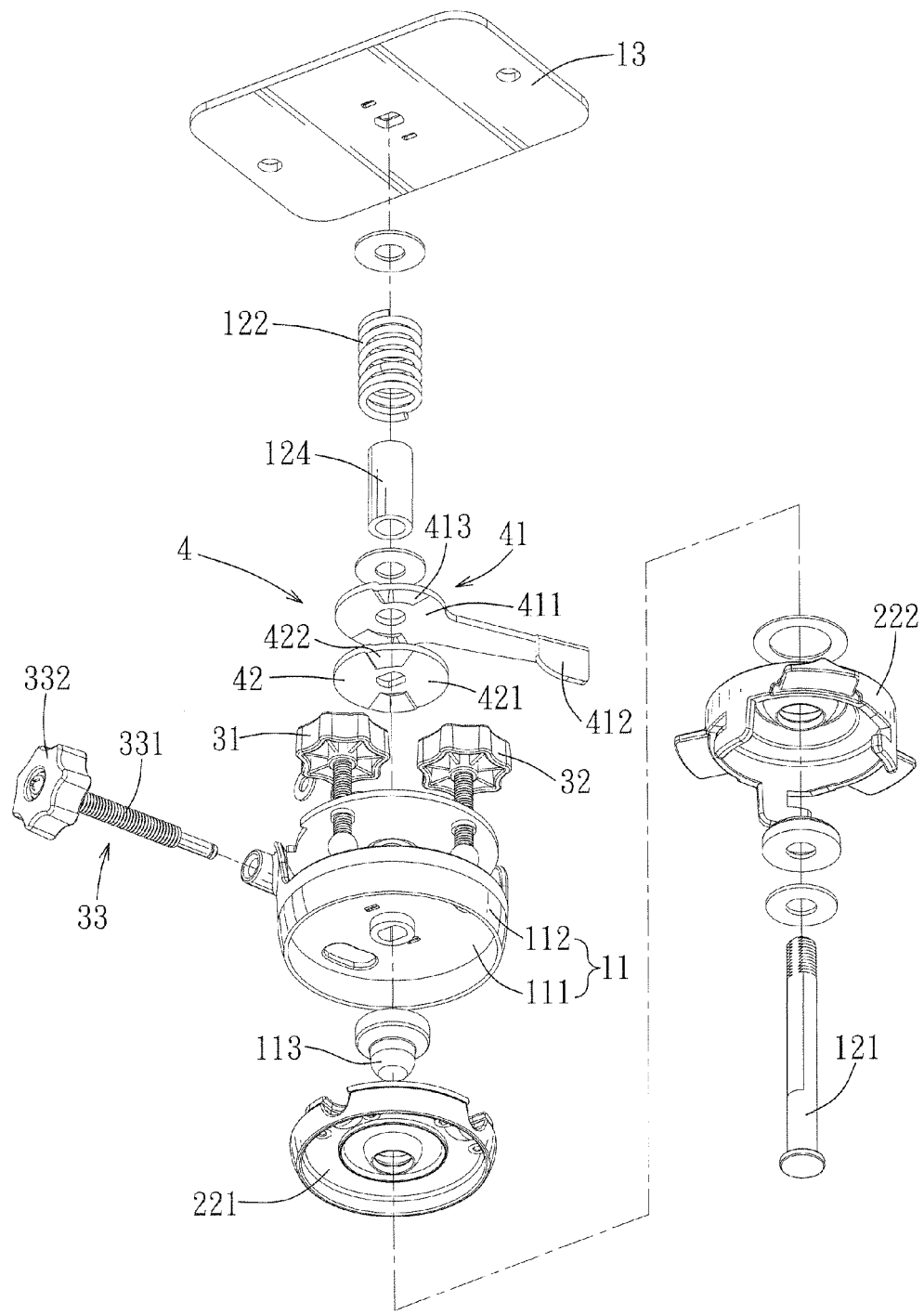
FIG. 2 is an exploded bottom perspective view of the preferred embodiment.
Figure 3:
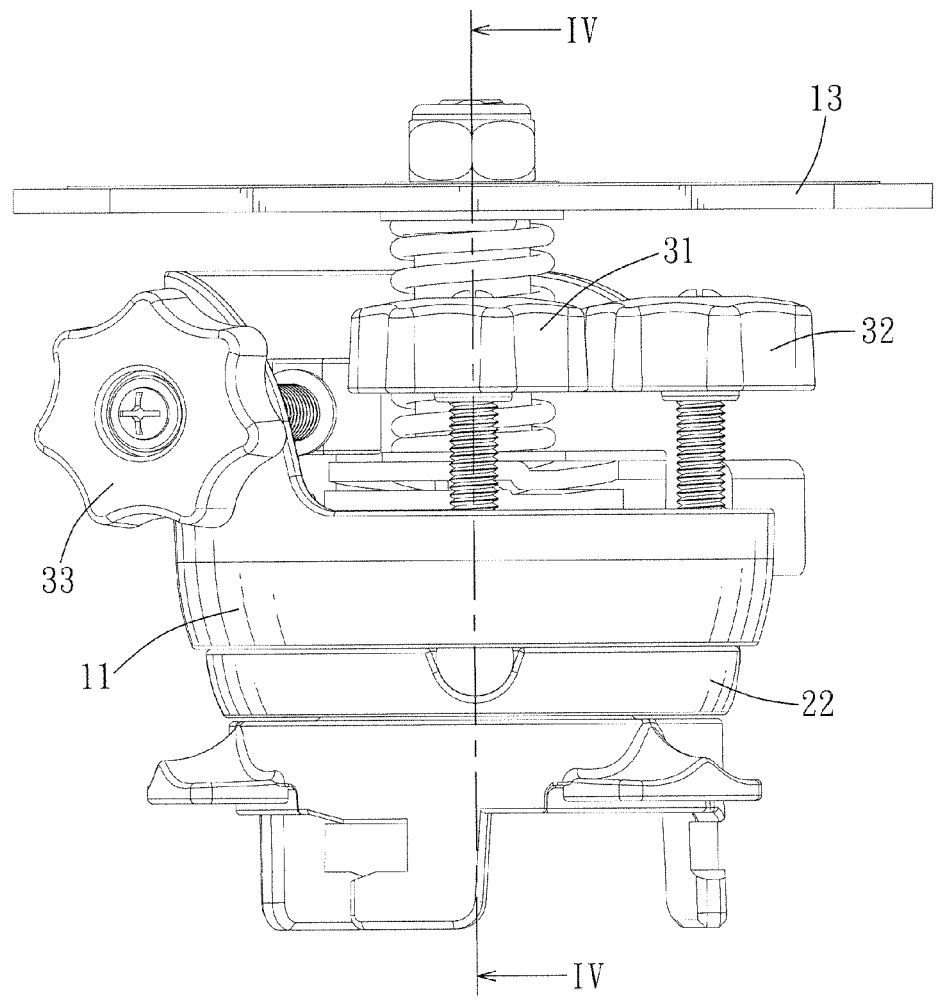
FIG. 3 is a side view of the preferred embodiment.
Figure 4:
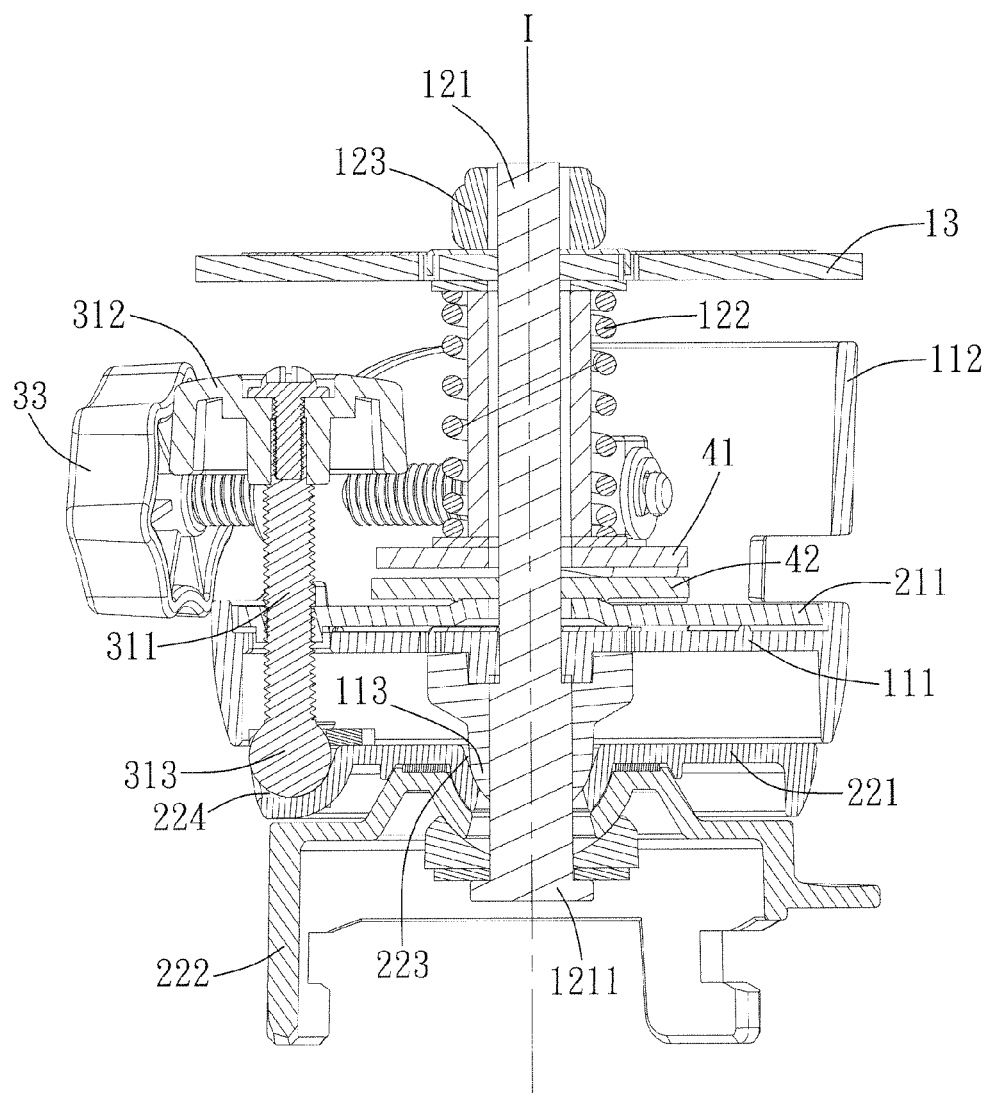
FIG. 4 is a sectional view taken along Line IV-IV in FIG. 3.

Referring to FIGS. 1 to 4, the preferred embodiment of a micro-adjustable supporting device according to this invention includes a fixed unit 1, a movable unit 2, an adjusting unit 3, and a locking unit 4.

The fixed unit 1 includes a mounting seat 11, a connecting shaft assembly 12, and a fixing member 13. The movable unit 2 includes a rotating assembly 21 disposed rotatably in the mounting seat 11, and a bottom seat assembly 22 disposed under the rotating assembly 21. The mounting seat 11 has a bottom wall 111, a surrounding wall 112 extending upwardly from a periphery of the bottom wall 111, and a truncated semi-spherical portion 113 extending downwardly from the bottom wall 111. The rotating assembly 21 includes a rotary disk 211 and a positioning element 212 disposed pivotally on the rotary disk 211. The rotary disk 211 is superposed rotatably on the bottom wall 111 of the mounting seat 11, and is surrounded by the surrounding wall 112. The positioning element 212 is rotatable about a central axis thereof on the rotary disk 211, and is formed with a through hole 2121. The bottom seat assembly 22 includes an upper coupling member 221 disposed rotatably under the mounting seat 11, a lower coupling member 222 disposed under the upper coupling member 221, and a central socket portion 223 disposed at a central portion of the upper coupling member 221 and engaging fittingly the truncated semi-spherical portion 113 to constitute a ball-and-socket joint. The connecting shaft assembly 12 includes a shaft 121 extending through the bottom seat assembly 22, the mounting seat 11, and the rotating assembly 21 along an axis (I) to connect with the fixing member 13, and a resilient element 122 configured as a coiled compression spring and sleeved on the shaft 121 for providing a biasing force to press the rotating assembly 21 and the bottom seat assembly 22 against the mounting seat 11. In particular, the shaft 131 extends upwardly through the lower coupling member 222, the central socket portion 223 of the upper coupling member 221, the truncated semi-spherical portion 113 and the bottom wall 111 of the mounting seat 11, the rotary disk 211 of the rotating assembly 21, the resilient element 122, and the fixing member 13. The shaft 121 has a bottom end formed with a flange 1211 extending radially and outwardly therefrom and abutting against the lower coupling member 222, and an externally threaded top end 1212. A nut 123 engages the externally threaded top end 1212 of the shaft 121, and abuts against a top surface of the fixing member 13 to retain the fixing member 13 on the shaft 121 to thereby confine the resilient element 122, the rotating assembly 21, the mounting seat 11, and the bottom seat assembly 22 between the fixing member 13 and the flange 1211. As such, the resilient element 122 is disposed between the fixing member 13 and the rotating assembly 21 for biasing the rotating assembly 21 and the bottom seat assembly 22 toward the mounting seat 11. A sleeve 124 is disposed between the shaft 121 and the resilient element 122 to facilitate smooth movement of the resilient element 122 on the shaft 121. Due to the presence of the ball-and-socket joint including the central socket portion 223 and the truncated semi-spherical portion 113 of the mounting seat 11, the bottom seat assembly 22 can be tilted and rotated about the axis (I). The rotating assembly 21 is rotatable about the axis (I). In this embodiment, the fixing member 13 is connected fixedly to a support surface (not shown), such as a ceiling, and the lower coupling member 222 is connected to a projector (not shown). The shaft 121 has opposite flat side surfaces 1213 engaging respectively two straight sides 110' of an elliptical central hole 110 in the mounting seat 11, so as to prevent rotation of the shaft 121 relative to the mounting seat 11. The rotating assembly 21, the mounting seat 11, and the bottom seat assembly 22 are supported by the flange 1211 of the shaft 121 and a washer 14, so that the position of the mounting seat 11 relative to the fixing member 13 is fixed due to gravity thereof.

The locking unit 4 is sleeved on the shaft 121, and is clamped between the resilient element 122 and the rotating assembly 21, and includes a rotatable controller 41 and a spacer 42 clamped between the controller 41 and the rotating assembly 21. The spacer 41 is configured as a plate. A top surface of the spacer 41 has two diametrically opposed concave portions each formed with an inclined surface portion 422. The controller 41 includes a main body 411 permitting extension of the shaft 121 therethrough, a push lever 412 extending from the main body 411, and two inclined projections 413 formed on the main body 411 and in slidable contact with the inclined surface portions 422, respectively. When the push lever 412 is rotated, the inclined projections 413 slide on the inclined surface portions 422, respectively. The sliding movement of the inclined projections 413 on the inclined surface portions 422 results in a change in the distance between the fixing member 13 and the locking unit 4. When the distance between the fixing member 13 and the locking unit 4 reduces, the biasing force of the resilient element 122 increases. In this embodiment, when the inclined projections 413 are disposed respectively at upper ends of the inclined surface portions 422, the fixing member 13 is spaced apart from the locking unit 4 by a minimum distance so that the movable unit 2 is in a fully locked state, where the resilient element 122 provides a maximum biasing force and where the rotating assembly 21 and the bottom seat assembly 22 are locked on the mounting seat 11. When the inclined projections 413 are moved respectively from the upper ends of the inclined surface portions 422 onto middle portions of the inclined surface portions 422, the distance between the fixing member 13 and the locking unit 40 increases to thereby convert the movable unit 2 into a semi-locked state, where the upper and lower coupling members 221, 222 are in frictional contact with each other in such a manner to co-rotate with each other relative to the mounting seat 11 in response to rotation of the projector. When the inclined projections 413 are disposed respectively on lower ends of the inclined surface portions 422, the fixing member 13 is spaced apart from the locking unit 4 by a maximum distance so that the movable unit 2 is in a released state, where the resilient element 122 provides a minimum biasing force and where the rotating assembly 21 and the bottom seat assembly 22 are released from the mounting seat 11, so as to allow for rotation of the lower coupling member 222 relative to the upper coupling member 221 when the projector is rotated.

In this embodiment, the spacer 42 is disposed to prevent rotation of the controller 41 from being transferred to the rotary disk 211. Alternatively, the spacer 42 may be omitted from the locking unit 4. If this occurs, the inclined surface portions 422 can be disposed at the rotary disk 211. In addition, the locking unit 4 may include only one inclined projection 413 and only one inclined surface portion 422, and the upper and lower coupling members 221, 222 may be formed integrally with each other.

Figure 5:
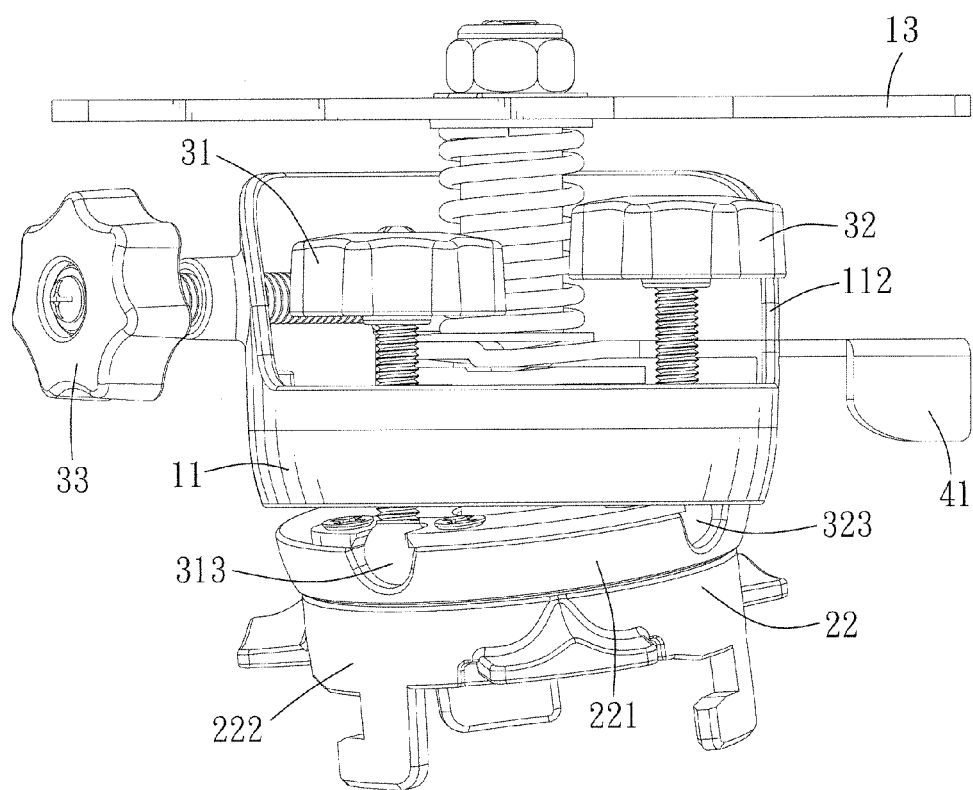
FIG. 5 is an assembled perspective view of the preferred embodiment, illustrating that at least one of first and second tilt-adjusting elements is operated, such that a bottom end of the first tilt-adjusting element is below that of the second tilt-adjusting element to thereby tilt a bottom seat assembly.
Figure 6:
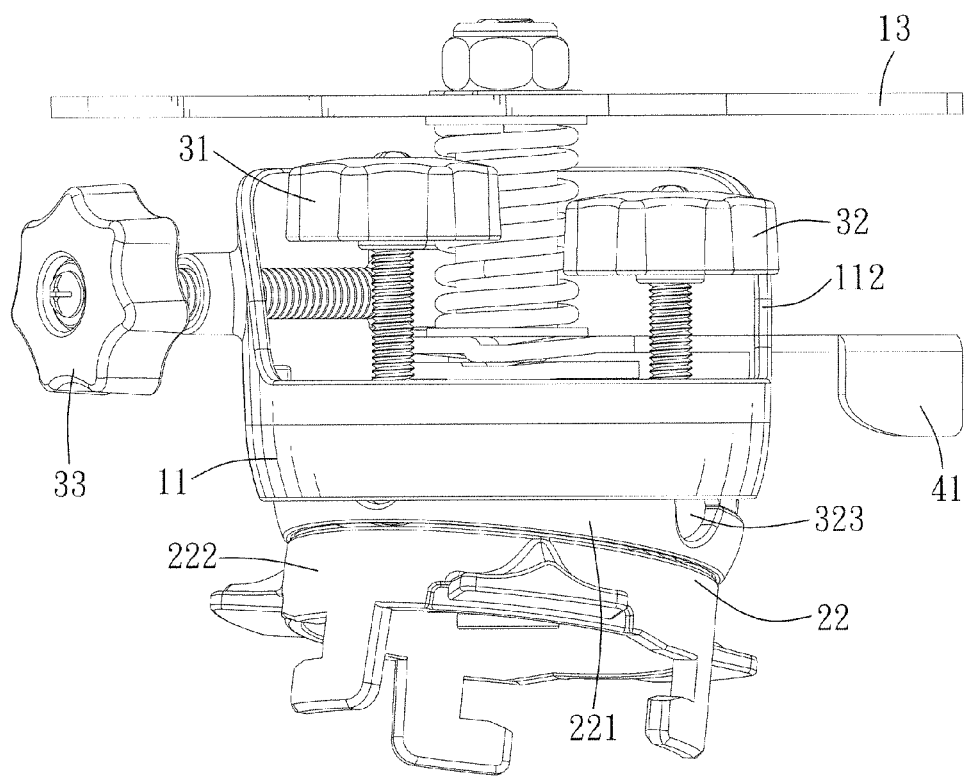
FIG. 6 is an assembled perspective view of the preferred embodiment, illustrating that at least one of the first and second tilt-adjusting elements is operated, such that the bottom end of the first tilt-adjusting element is above that of the second tilt-adjusting element to thereby tilt the bottom seat assembly.
Figure 7:
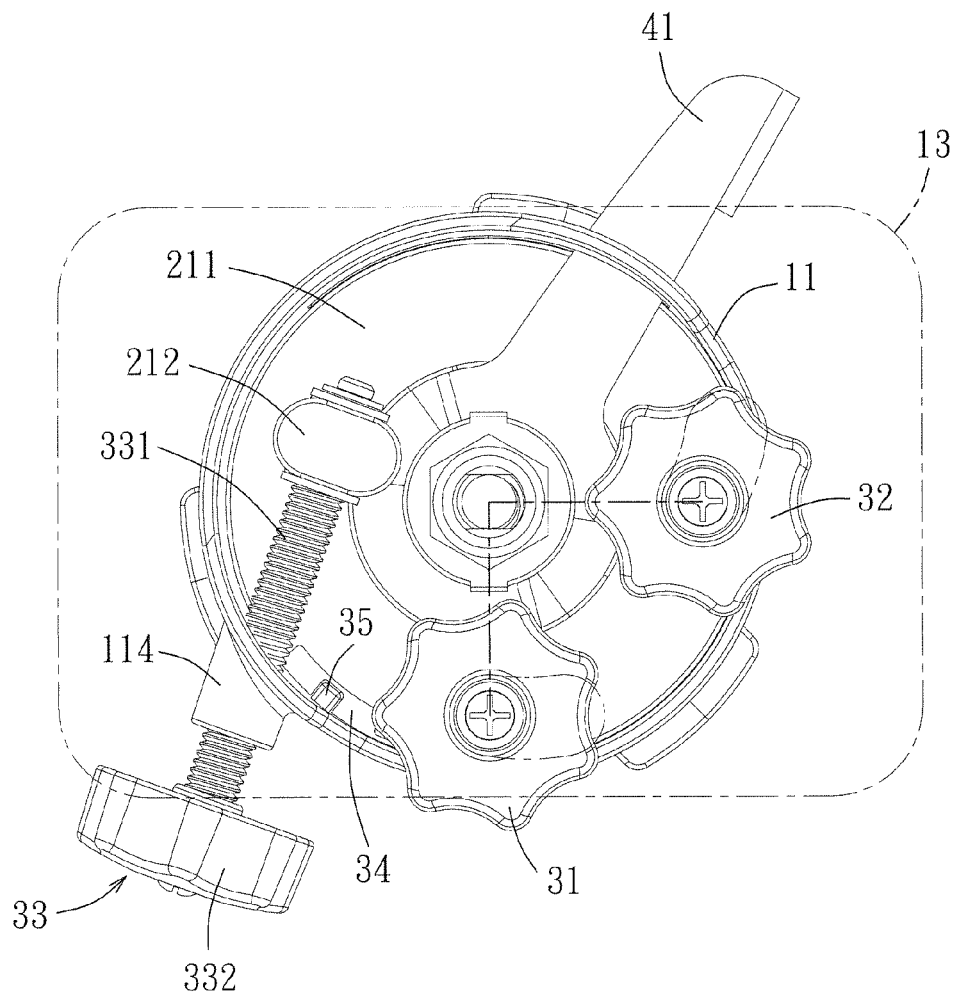
FIGS. 7, 8, and 9 are schematic top views of the preferred embodiment, illustrating that an angle-adjusting element is operated to change the rotational angle of the bottom seat assembly.

The adjusting unit 3 includes a pair of spaced-apart first and second tilt-adjusting elements 31, 32, and an angle-adjusting element 33. Each of the first and second tilt-adjusting elements 31, 32 extend through the rotating assembly 21 to connect with the bottom seat assembly 22, and is operable to move relative to the rotating assembly 21 in a direction parallel to the axis (I) to thereby adjust a tilt angle of the bottom seat assembly 22 relative to the axis (I). In this embodiment, each of the first and second tilt-adjusting elements 31, 32 includes an upright threaded rod portion 311, 321, a rotating portion 312, 322 connected to a top end of the threaded rod portion 311, 321 and exposed outwardly of the mounting seat 11 for manual operation, and a spherical portion 313, 323 connected to a bottom end of the threaded rod portion 311, 321. The bottom seat assembly 22 further includes two cavities 224, 225 formed in the upper coupling member 221 and engaging respectively and fittingly the spherical portions 313, 323 of the first and second tilt-adjusting elements 31, 32. That is, the cavities 224, 225 are defined by curved wall surfaces. Alternatively, each of the cavities 224, 225 may be a cubic cavity that is defined by a flat bottom wall surface and four interconnected sidewall surfaces perpendicular to the flat bottom wall surface. The threaded rod portions 311, 321 extend threadably through the rotary disk 211. As such, the rotating portions 312, 322 can be rotated to move the first and second tilt-adjusting elements 31, 32 relative to the rotary disk 211 in a direction parallel to the axis (I). Since one thread pitch of each of the first and second tilt-adjusting elements 31, 32 is relatively small, each of the first and second tilt-adjusting elements 31, 32 can be moved relative to the rotary disk 211 by a relatively small distance. Hence, by controlling the moving directions and distances of the threaded rod portions 311, 321, the tilt angle of the bottom seat assembly 22 can be micro-adjusted conveniently. With further reference to FIG. 7, the first and second tilt-adjusting elements 31, 32 are spaced apart from each other by an angle of 90 degrees with respect to the axis (I). Either the first or second tilt-adjusting elements 31, 32 is operable to activate the upper coupling member 221 to thereby adjust the tilt angle of the projector, so that a bottom end of the first tilt-adjusting element 31 is below that of the second tilt-adjusting element 32, as shown in FIG. 5, or is above that of the second tilt-adjusting element 32, as shown in FIG. 6.

Figure 8:
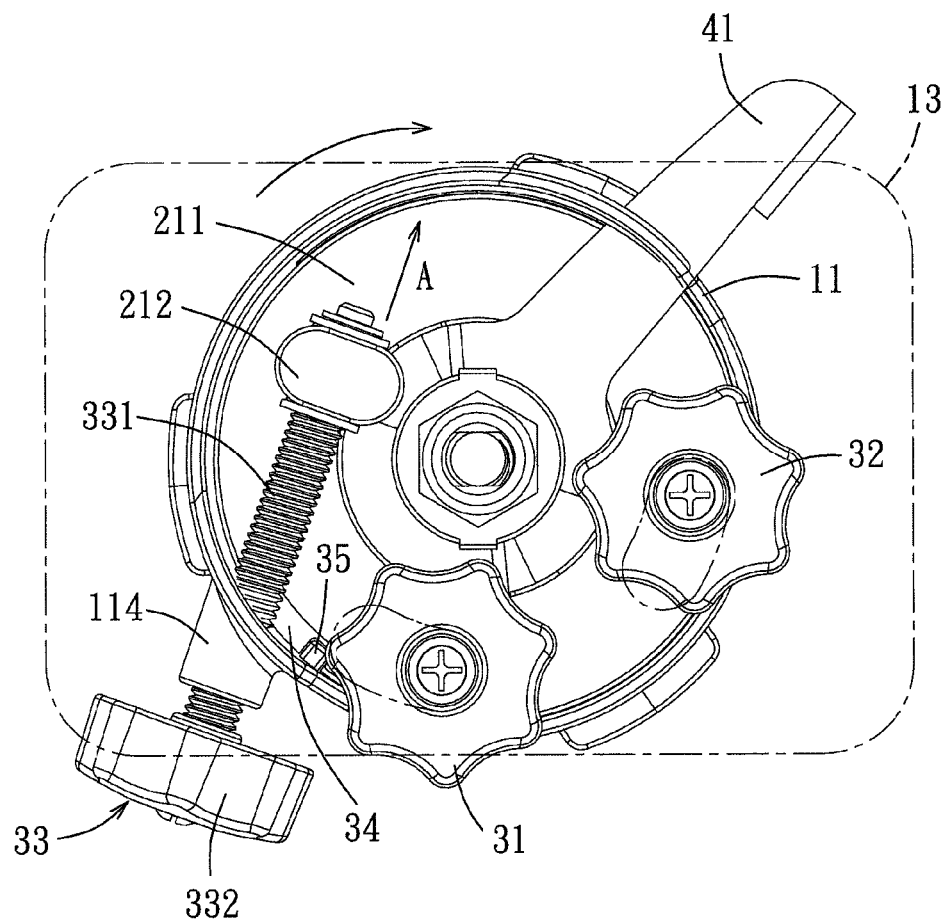
Figure 9:
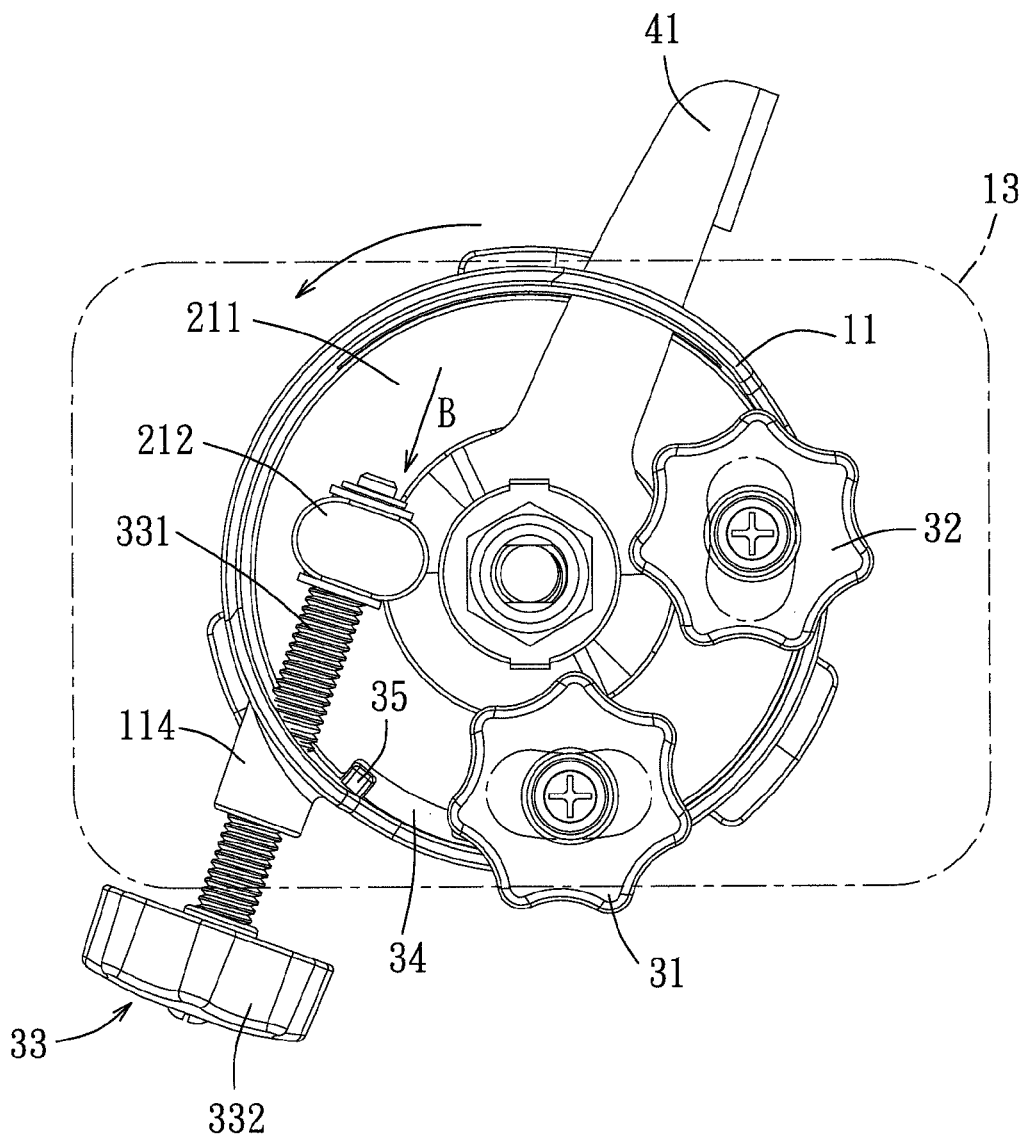

With particular reference to FIGS. 1, 3, 4, and 7, the angle-adjusting element 33 is disposed movably on the mounting seat 11, and is connected to the rotating assembly 21. The angle-adjusting element 33 is operable to move relative to the mounting seat 11 to rotate the rotating assembly 21 and the bottom seat assembly 22 about the axis (I) to a desired angular position. In other words, the rotational angle of the projector is micro-adjustable through operation of the angle-adjusting element 33. The angle-adjusting element 33 includes a threaded rod portion 331 perpendicular to the threaded rod portions 311, 321 of the first and second tilt-adjusting elements 31, 32 and having an end connected rotatably to the positioning element 212, and a rotating portion 332 connected fixedly to an opposite end of the threaded rod portion 331 and exposed outwardly of the mounting seat 11 for manual operation. The threaded rod portion 331 has a threaded section 3311, a non-threaded section 3312 having an end connected to an end of the threaded section 3311, and an annular groove 333 formed in an opposite end of the non-threaded section 3312. The non-threaded section 3312 extends through the through hole 2121 of the positioning member 212. A C-shaped retaining ring 334 is received within the annular groove 333 to prevent removal of the non-threaded section 3312 from the through hole 2121. The surrounding wall 112 of the mounting seat 11 has a generally horizontal tubular portion 114. The threaded rod portion 331 extends threadably through the tubular portion 114. The rotating portion 332 is operable to move the threaded rod portion 331 within the tubular portion 114 to thereby rotate the rotary disk 211. When the rotating portion 332 is rotated to move the angle-adjusting element 33 inwardly from a first position shown in FIG. 7 to a second position shown in FIG. 8, the angle-adjusting element 33 pushes and moves the positioning member 212 in a direction (A) to thereby rotate the rotary disk 211 clockwise. When the rotating portion 332 is rotated to move the angle-adjusting element 33 outwardly from the first position to a third position shown in FIG. 9, the angle-adjusting element 33 pushes and moves the positioning member 212 in an opposite direction (B) to thereby rotate the rotary disk 211 counterclockwise. The adjusting unit 3 further includes a position-limiting slot 34 formed in a peripheral portion of the rotary disk 211, and a position-limiting block 35 disposed fixedly on the mounting seat 11 and movable within the position-limiting slot 34 for limiting the rotational angle range of the rotary disk 211 relative to the mounting seat 11. With particular reference to FIGS. 1, 3, 5, and 6, when the rotary disk 211 is rotated relative to the mounting seat 11, since the first and second tilt-adjusting elements 31, 32 extend through the rotary disk 211, rotation of the rotary disk 211 about the axis (I) is transferred to the first and second tilt-adjusting elements 31, 32.

Furthermore, since the cavities 224, 225 engage respectively the spherical portions 313, 323, rotation of the first and second tilt-adjusting elements 31, 32 about the axis (I) is transferred to the bottom seat assembly 22. Consequently, through operation of the first and second tilt-adjusting elements 31, 32 and the angle-adjusting element 33, the rotational angle and tilt angle of the projector can be micro-adjusted conveniently to allow the projection to face accurately a projection screen (not shown) for forming a clear image on a desired position on the projection screen.

In this embodiment, the tilt angle of the bottom seat assembly 22 is micro-adjustable when the movable unit 2 is in the semi-locked or released state, and the rotational angle of the bottom seat assembly 22 is micro-adjustable only when the movable unit 2 is in the semi-locked state. When it is desired to rotate the projector about the axis (I) to a selected angular position by a relatively large angle, the movable unit 2 needs to be converted into the released state. Upon completion of the large-angle rotational angle adjustment, the controller 41 can be rotated to convert the movable unit 2 into the locked state to maintain the projector at the selected angular position.

In view of the above, the rotational angle and tilt angle of the supporting device of this invention can be micro-adjusted. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:
1. A micro-adjustable supporting device comprising:
a fixed unit including a mounting seat;
a movable unit including a rotating assembly disposed rotatably in said mounting seat and rotatable about an axis, and a bottom seat assembly disposed under said mounting seat and rotatable about said axis; and
an adjusting unit including a pair of spaced-apart first and second tilt-adjusting elements, and an angle-adjusting element, each of said first and second tilt-adjusting elements extending through said rotating assembly to connect with said bottom seat assembly and being operable to move relative to said rotating assembly in a direction parallel to said axis to thereby adjust a tilt angle of said bottom seat assembly relative to said axis, said angle-adjusting element being disposed movably on said mounting seat and connected to said rotating assembly, said angle-adjusting element being operable to move relative to said mounting seat to rotate said rotating assembly and said bottom seat assembly about said axis;
wherein said fixed unit further includes a connecting shaft assembly and a fixing member, said connecting shaft assembly including a shaft extending through said bottom seat assembly, said mounting seat, and said rotating assembly and connected to said fixing member, and a resilient element sleeved on said shaft for providing a biasing force to press said rotating assembly and said bottom seat assembly against said mounting seat,
further comprising a locking unit operable to change the biasing force so as to convert said movable unit between a fully locked state, where said rotating assembly and said bottom seat assembly are locked on said mounting seat, and a released state, where said rotating assembly and said bottom seat assembly are released from said mounting seat and where said adjusting unit is operable to either rotate said bottom seat assembly about said axis relative to said mounting seat or adjust the tilt angle of said bottom seat assembly relative to said axis
wherein said resilient element is disposed between said fixing member and said rotating assembly, said shaft extending through said locking unit, said locking unit being clamped between said resilient element and said rotating assembly,
wherein said locking unit includes a rotatable controller and a spacer clamped between said controller and said rotating assembly, said spacer being configured as a plate and having a top surface, said top surface having a concave portion formed with an inclined surface portion, said controller including a main body permitting extension of said shaft therethrough, a push lever extending from said main body, and an inclined projection formed on said main body and in slidable contact with said inclined surface portion of said spacer such that, through operation of said push lever, said inclined projection is slidable on said inclined surface portion to thereby convert said movable unit between the fully locked state and the released state.

2. The micro-adjustable supporting device as claimed in claim 1, wherein said first and second tilt-adjusting elements are spaced apart from each other by an angle of 90 degrees with respect to said axis.

3. The micro-adjustable supporting device as claimed in claim 1, wherein:
said mounting seat of said fixed unit has a bottom wall, a surrounding wall extending upwardly from a periphery of said bottom wall, and a truncated semi-spherical portion extending downwardly from said bottom wall;
each of said first and second tilt-adjusting elements includes an upright threaded rod portion, a rotating portion connected to a top end of said threaded rod portion and exposed outwardly of said mounting seat for manual operation, and a spherical portion connected to a bottom end of said threaded rod portion; and said bottom seat assembly includes a central socket portion engaging fittingly said truncated semi-spherical portion of said mounting seat and permitting extension of said shaft therethrough, and two cavities engaging respectively and fittingly said spherical portions of said first and second tilt-adjusting elements.

4. The micro-adjustable supporting device as claimed in claim 3, wherein:

said bottom seat assembly further includes an upper coupling member formed with said two cavities and driven by said first and second tilt-adjusting elements, and a lower coupling member disposed under said upper coupling member, said upper coupling member being biased by said resilient element to press against said lower coupling member, such that said lower coupling member is rotatable about said axis relative to said upper coupling member when said movable unit is in the released state; and said movable unit is further convertible into a semi-locked state through operation of said push lever, so as to allow for co-rotation of said upper and lower coupling members relative to said mounting seat.

5. The micro-adjustable supporting device as claimed in claim 3, wherein said rotating assembly includes a rotary disk and a positioning element disposed pivotally on said rotary disk, said shaft of said fixed unit and said threaded rod portions of said first and second tilt-adjusting elements extending through said rotary disk, said angle-adjusting element including a threaded rod portion perpendicular to said threaded rod portions of said first and second tilt-adjusting elements and having an end connected rotatably to said positioning element, and a rotating portion connected fixedly to an opposite end of said threaded rod portion of said angle-adjusting element and exposed outwardly of said mounting seat for manual operation, said threaded rod portion of said angle-adjusting element extending threadably through said surrounding wall of said mounting seat.

6. The micro-adjustable supporting device as claimed in claim 5, wherein said adjusting unit further includes a position-limiting slot formed in said rotary disk, and a position-limiting block disposed fixedly on said mounting seat and movable within said position-limiting slot for limiting a rotational angle range of said rotary disk relative to said mounting seat.

\* \* \* \* \*